United States Patent
Nishida

[19]

[11] Patent Number: 6,064,461

[45] Date of Patent: May 16, 2000

[54] LIQUID CRYSTAL DISPLAY DEVICE AND METHOD FOR PRODUCING THE SAME

[75] Inventor: Kenji Nishida, Kyoto, Japan

[73] Assignee: Sharp Kabushiki Kaisha, Japan

[21] Appl. No.: 08/569,593

[22] Filed: Dec. 8, 1995

[30] Foreign Application Priority Data

Aug. 12, 1994 [JP] Japan .................................. 6-304509

[51] Int. Cl.⁷ .................................................. G02F 1/1339
[52] U.S. Cl. .......................................................... 349/155
[58] Field of Search ............................................. 349/155

[56] References Cited

U.S. PATENT DOCUMENTS

| | | | |
|---|---|---|---|
| 4,165,157 | 8/1979 | Kobale et al. | 349/155 |
| 5,091,911 | 2/1992 | Tulip | 372/2 |
| 5,130,831 | 7/1992 | Kohara et al. | 349/155 |
| 5,556,670 | 9/1996 | Mihara et al. | 349/155 |

FOREIGN PATENT DOCUMENTS

| | | | |
|---|---|---|---|
| 2-129619 | 5/1990 | Japan | 349/155 |
| 2-308224 | 12/1990 | Japan . | |
| 4-9011 | 1/1992 | Japan | 349/155 |
| 4-321013 | 11/1992 | Japan . | |
| 5-333346 | 12/1993 | Japan | 349/155 |
| 6-043468 | 2/1994 | Japan . | |
| 6-095127 | 4/1994 | Japan . | |
| 6-242452 | 9/1994 | Japan | 349/155 |

*Primary Examiner*—James A. Dudek
*Attorney, Agent, or Firm*—Dike, Bronstein, Roberts & Cushman, LLP; David G. Conlin; William J. Daley, Jr.

[57] ABSTRACT

The liquid crystal display device of the present invention in which spacers for controlling a cell gap are selectively dispersed on at least one of a pair of substrates disposed so as to oppose each other with a liquid crystal layer interposed therebetween, wherein at least surfaces of the spacers are coated with an adhesive resin and the spacers are fixed on the at least one of the pair of substrates via the adhesive resin.

9 Claims, 8 Drawing Sheets

LIQUID CRYSTAL DISPLAY DEVICE AND METHOD FOR PRODUCING THE SAME

BACKGROUND OF THE INVENTION

1. Field of the Invention

The present invention relates to direct-view-type display devices; such as those of a transmission type and a reflection type, a projection type display device; a liquid crystal display device used in various information processing devices; and a method for producing the same. More specifically, the present invention relates to a liquid crystal display device in which spacers are selectively dispersed between two substrates with a liquid crystal layer interposed therebetween so as to control a cell gap.

2. Description of the Related Art

Liquid crystal display devices have a structure in which a pair of substrates, at least one of which is transparent, are provided with a predetermined gap and liquid crystal is injected between the substrates. In order to keep this predetermined gap, for example, spacers are dispersed on the surface of the substrate on a liquid crystal layer side, and then the pair of substrates are attached to each other. Because of this structure, a cell gap is kept almost equal to a size of the spacers. Conventionally, the spacers are dispersed almost over the entire surface of the substrate on the liquid crystal layer side.

Such liquid crystal display devices have the following problems: When liquid crystal is injected or after the substrates are attached to each other to construct a panel, the spacers move due to the vibration, change in temperature, or the like, to cause inconsistencies in color resulting from inconsistencies in cell gap, and the spacers damage alignment films while moving to cause inconsistencies in display.

In addition, when spacers are dispersed on the substrate so as to be placed in regions contributing to a display (i.e., pixels), since the spacers exhibit optical anisotropy different from that of liquid crystal, light leaks through the spacers resulting in decreased contrast.

Japanese Laid-Open Patent Publication No. 6-95127 discloses the following method for fixing spacers on an alignment film: in a step for spraying spacers on an alignment film containing a solvent, the spacers are heated by high frequency radiation before the spacers reach the alignment film; the heated spacers are partially varied in the alignment film and fixed at the positions because the heat of the spacers evaporates the solvent of the alignment film and cures the alignment film. Then the substrate is subject to a heat treatment to cure the alignment film completely. The spacers may be coated with a thermoplastic polymer. Since the spacers are allowed to adhere to the entire surface of the alignment film formed on an electrode substrate, this method has a problem in that light leakage through spacers present in the pixel regions cause a decrease in contrast.

In order to solve the above-mentioned problem, a method for placing spacers only in regions other than pixels has been suggested. Specifically, a method utilizing a photosensitive thermoplastic resin as described in Japanese Laid-Open Patent Publication No. 2-308224; a method utilizing static electricity as described in Japanese Laid-Open Patent Publication No. 4-321013; a method for placing spacers in a black mask as described in Japanese Laid-Open Patent Publication No. 6-43468, have already been suggested.

According to the method utilizing a photosensitive thermoplastic resin as disclosed in Japanese Laid-Open Patent Publication No. 2-308224; before an alignment film is formed on a substrate, a photosensitive thermoplastic resin film is formed on the substrate and patterned so that the patterned photosensitive resin film is formed only in regions other than pixels, and spacers are dispersed over the substrate. The substrate is heated under pressure to fix the spacers in the patterned photosensitive resin film.

According to the above-mentioned method, the alignment film is formed on the patterned photosensitive resin film on which the spacers are dispersed. Therefore, where a convex plate for printing is pressed against the substrate with the spacers dispersed thereon so that the alignment film is coated thereon by offset printing and flexographic printing; in some cases, spacers peel off from the electrode substrate to adhere to the convex plate.

Furthermore, when another alignment film is coated onto the other electrode substrate, the spacers adhering to the convex plate are transferred to this alignment film. The transferred spacers are not allowed to adhere to the electrode substrate, so that such spacers peel off in a rubbing step, a washing step, or the like, conducted later. In particular, in the case where the spacers are transferred onto pixel regions, regions where the transferred spacers peel off will have no alignment films.

More specifically, pinholes are formed in the alignment films and when a liquid crystal display device is completed, liquid crystal molecules cannot be aligned in the pinhole portions of the alignment film, resulting in a display defect and decrease in the number of good quality products.

Furthermore, during the rubbing step, the spacers adhering to the electrode substrate come into contact with a rubbing cloth. Therefore, the surface of the rubbing cloth coming into contact with the spacers becomes deformed. The alignment films rubbed with the deformed portion have inconsistencies in tilt angle. This causes a display defect when a liquid crystal device is completed.

Furthermore, the spacers adhering to the regions other than the pixels sometimes peel off from the substrate during rubbing. When rubbing is continued under this condition, the alignment film has scratches 10 as shown in FIG. 11, causing a display defect and decrease the number of good quality products.

According to the method utilizing static electricity as disclosed in Japanese Laid-Open Patent Publication No. 4-321013, spacers are charged and non-electrode portions are charged to a polarity opposite to that of the spacers, whereby the spacers are allowed to adhere to the non-electrode portions.

However, since the spacers dispersed in a hermetically sealed device fail to adhere to the electrode substrates, when the difference in electric potential between the spacers and the non-electrode portions is small the spacers also adhere to the pixel electrodes as shown in FIG. 12. Thus, when a liquid crystal display device is completed, light leaks through the spacers present on the pixel electrodes, leading to a decrease in contrast.

In contrast, in the case where the difference in electric potential between the spacers and the non-electrode portions is large; when a liquid crystal display device is completed, a display defect attributable to the charged spacers and non-electrode portions occurs and the number of good quality products decreases. Furthermore, in active-type liquid crystal display devices, there is a possibility of damage to active elements.

Furthermore, since the spacers do not adhere to the substrates, the spacers move due to the vibration and change in temperature during injection of liquid crystal or after a panel is constructed. As a result, inconsistencies in color resulting from inconsistencies in cell gap occurs. Inconsistencies in display occurs because the spacers damage the alignment films while moving.

According to the method for fixing spacers in a black mask as disclosed in Japanese Laid-Open Patent Publication No. 6-43468, dispersibility of the spacers in a resin material for a black mask is poor and the spacers are poorly dispersed as shown in FIG. 13, when a liquid crystal display device is completed by forming the black mask under this condition. Thus, inconsistencies in cell gap occur and a display becomes unsatisfactory, leading to decrease in the numbers of good quality products.

Furthermore, when the spacers are mixed in the resin material for the black mask and a mixture is allowed to stand, the spacers aggregate to further worsen the dispersibility of the spacers. When a liquid crystal display device is completed, inconsistencies in cell gap occur and a display becomes unsatisfactory, resulting in decrease in the number of good quality products. In ordinary wet dispersion, a dispersion liquid with spacers mixed therein is dispersed with stirring in order to prevent the spacers from aggregating. It is difficult to form a black mask while stirring the resin material for the black mask.

The spacers start aggregating by the time the resin material for the black mask is coated and cured on the electrode substrates. That is, in the case where the spacers are mixed in the resin material for the black mask, when the resin material has low viscosity, the dispersibility of the spacers right after being mixed in the black mask is satisfactory. However, the spacers start aggregating by the time when the liquid is coated and cured on the electrode substrates. In contrast, when the viscosity of the resin material for the black mask is high, the spacers are not likely to aggregate by the time when the liquid is coated and cured on the electrode substrates; however, the dispersibility of the spacers right after being mixed in the black mask becomes unsatisfactory.

Since alignment films are formed after the spacers are fixed, in the case where the alignment films are coated by offset printing or flexographic printing; the spacers sometimes peel off from the electrode substrates when a convex plate is pressed against the electrode substrates and the peeled spacers adhere to the convex plate, causing the same problems as those in the method utilizing a photosensitive thermoplastic resin disclosed in Japanese Laid-Open Patent Publication No. 2-308224.

Furthermore, during the rubbing step, a rubbing cloth comes into contact with the spacers adhering to the electrode substrates, so that the surface of the rubbing cloth which comes into contact with the spacers is deformed, causing the same problems as those in the method disclosed in Japanese Laid-Open Patent Publication No. 2-308224.

SUMMARY OF THE INVENTION

According to one aspect of the invention, a liquid crystal display device, in which spacers for controlling a cell gap are selectively dispersed on at least one of a pair of substrates disposed so as to oppose each other with a liquid crystal layer interposed therebetween, wherein at least the surfaces of the spacers are coated with an adhesive resin and the spacers are fixed on the at least one of the pair of substrates via the adhesive resin, is provided.

According to one embodiment of the invention, the adhesive resin is a thermoplastic resin.

According to another aspect of the invention, a method for producing a liquid crystal display device in which spacers for controlling a cell gap are selectively dispersed on at least one of a pair of substrates disposed so as to oppose each other with a liquid crystal layer interposed therebetween, is provided. The method includes the steps of:

dispersing spacers at least the surfaces of which are coated with an adhesive resin on the at least one of the pair of substrates; and selectively irradiating infrared rays to the spacers to allow the spacers to selectively adhere to the substrates.

According to one embodiment of the invention, in the selective irradiation step the infrared rays are irradiated to the spacers through a photomask, thereby allowing the spacers to selectively adhere to the substrates.

According to one embodiment of the invention, in the selective irradiation step the infrared rays are selectively irradiated to the spacers by scanning a infrared laser beam, thereby allowing the spacers to selectively adhere to the substrates.

According to one embodiment of the invention, in the selective irradiation step the infrared rays are irradiated to only the spacers dispersed in regions other than pixels, thereby allowing only the spacers dispersed in the regions other than the pixels to adhere to the substrates.

According to one embodiment of the invention, the spacer dispersing step is conducted after an alignment film is formed on the at least one of the pair of substrates and the spacers adhere to the alignment film.

According to one embodiment of the invention, the method further includes the step of removing the spacers not irradiated with the infrared rays by an ultrasonic cleaning method.

The liquid crystal display device of the present invention is constructed as follows: Alignment films are respectively formed on patterned electrode substrates, and the alignment films are subjected to alignment treatment. Spacers, at least the surfaces of which are coated with a thermoplastic resin, are dispersed on the electrode substrate which has been subjected to alignment treatment. Infrared rays are selectively irradiated to the spacers so as to selectively allow the spacers to adhere to the substrate. The spacers not adhering to the substrate are removed.

As described above, the spacers are allowed to adhere to the substrate after the steps (i.e., alignment film printing, rubbing, etc.) in which the adhering spacers may peel off from the substrate, so that the spacers are not likely to peel off from the substrate. Thus, pinholes in the alignment film and damages thereof caused by peeling-off of the spacers are eliminated, and a display defect caused by the pinholes and the damages are eliminated.

Furthermore, since the spacers can be dispersed with satisfactory dispersibility without aggregating, a display defect caused by aggregation of the spacers can be eliminated. At least the surfaces of the spacers are coated with a thermoplastic resin. Therefore, the spacers are preferably dispersed by wet dispersion. The wet dispersion allows the spacers to be dispersed satisfactorily without any aggregation. When the spacers are dispersed by dry dispersion, the spacers are likely to aggregate.

Furthermore, it is not required to charge the spacers, so that there is no possibility of a display defect and damages of active elements caused by charged spacers.

Furthermore, since the spacers are allowed to adhere to the electrode substrate, the spacers are not likely to move by vibration, change in temperature, and the like, during liquid crystal injection or after the construction of a liquid crystal panel to cause inconsistencies in color resulting from inconsistencies in cell gap; and the spacers will not damage alignment films while moving to cause inconsistencies in display.

Furthermore, since infrared rays are irradiated to only regions where the spacers are desired to be fixed, the spacers can be fixed without fail in only the regions where the spacers are desired to be fixed. For example, in the case where the spacers are allowed to adhere to regions other than pixel regions, infrared rays can be irradiated by drawing using an infrared ray laser, through a photomask, or the like; therefore, the spacers can be fixed to only the desired regions without fail. Because of this, the spacers will not be present in pixel regions, so that decrease in contrast caused by light leakage through the spacers can be prevented.

The case where the spacers, of which at least the surfaces are coated with a thermoplastic resin, are allowed to adhere to the entire surface of the electrode substrate will be compared with the case of the present invention.

In the case where the spacers were allowed to adhere to the entire surface of the electrode substrate, the spacers, of which at least the surfaces are coated with a thermoplastic resin, are dispersed on the electrode substrate which has been subjected to alignment treatment, and the spacers are heated by hot air, infrared rays, or the like, whereby the spacers are allowed to adhere to the substrate.

In contrast, according to the present invention, the spacers, of which at least the surfaces are coated with a thermoplastic resin are dispersed on the electrode substrate which has been subjected to alignment treatment. The spacers are heated by drawing using an infrared rays laser through a photomask, or the like, whereby the spacers are allowed to adhere to the substrate. Therefore, although the number of steps is the same in both of the cases, the spacers can be allowed to adhere to, for example, only the regions other than pixel regions in the present invention.

Thus, the invention described herein makes possible the advantage of providing a liquid crystal display device with a high contrast and a uniform cell gap by forming an alignment film on a patterned electrode substrate, dispersing spacers of which at least surfaces are coated with a thermoplastic resin on the electrode substrate subjected to alignment treatment, selectively irradiating infrared rays to the spacers so as to allow the spacers to adhere to the electrode substrate, and removing the spacers not adhering to the electrode substrate.

This and other advantages of the present invention will become apparent to those skilled in the art upon reading and understanding the following detailed description with reference to the accompanying figures.

DESCRIPTION OF THE PREFERRED EMBODIMENTS

EXAMPLE 1

Figure 1:
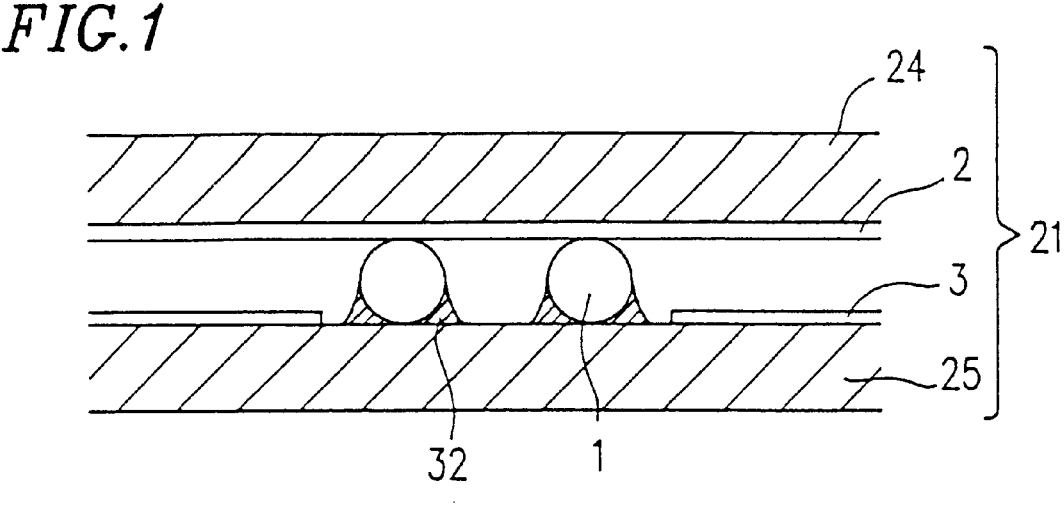
FIG. 1 is a cross-sectional view showing a structure of a liquid crystal display device produced according to an example of the present invention.

FIG. 1 is a cross-sectional view showing the structure of a liquid crystal display device 21 according to the present invention.

A pair of glass substrates 24 and 25 (thickness: 0.7 mm) with a transparent conductive film made of ITO formed thereon were prepared. The substrates 24 and 25 were washed and resists (not shown) were coated onto the respective substrates 24 and 25 by a roll coater. Then, the resist on the substrate 24 (common electrode substrate) was irradiated with UV-rays through a photomask for a common electrode substrate to be sensitized, and a transparent electrode 2 was patterned by wet etching. Similarly, the resist on the substrate 25 (segmented electrode substrate) was irradiated with UV-rays through a photomask for a segmented electrode substrate to be sensitized, and a transparent electrode 3 was patterned by wet etching.

Thereafter, an alignment film of a polyimide type was coated onto the substrates 24 and 25 by flexographic printing, baked in a furnace, and subjected to rubbing treatment.

About six grams of spacers 1 obtained by coating resinous beads with-a thermoplastic acryl resin 32 were dispersed in a mixed liquid containing 240 g of water and 60 g of isopropyl alcohol to prepare a spacer dispersing liquid.

Figure 2:
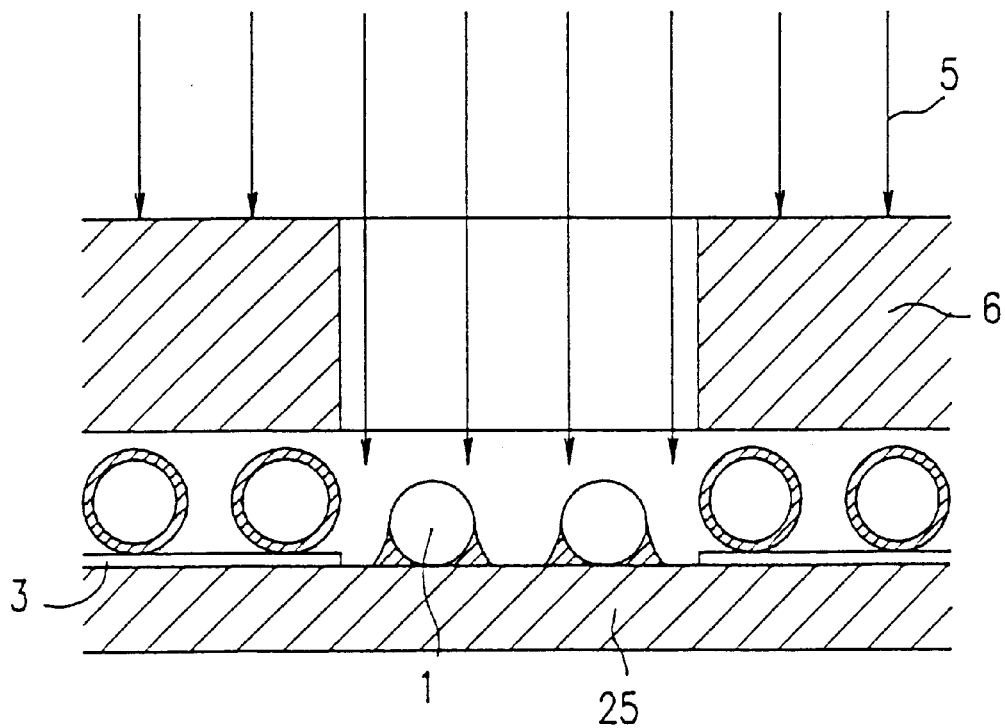
FIG. 2 is a schematic view of a liquid crystal display device when infrared rays are irradiated through a photomask in Examples 1, 2, and 3 of the present invention.

The spacer dispersing liquid was dispersed on the substrate 25, which had been subjected to alignment treatment, and infrared rays 5 were irradiated to the substrate 25 through a photomask 6 for a segmented electrode substrate, as shown in FIG. 2. Thus, only the spacers 1 in regions other than segmented electrodes 3 were allowed to adhere to the substrate 25.

Figure 5:
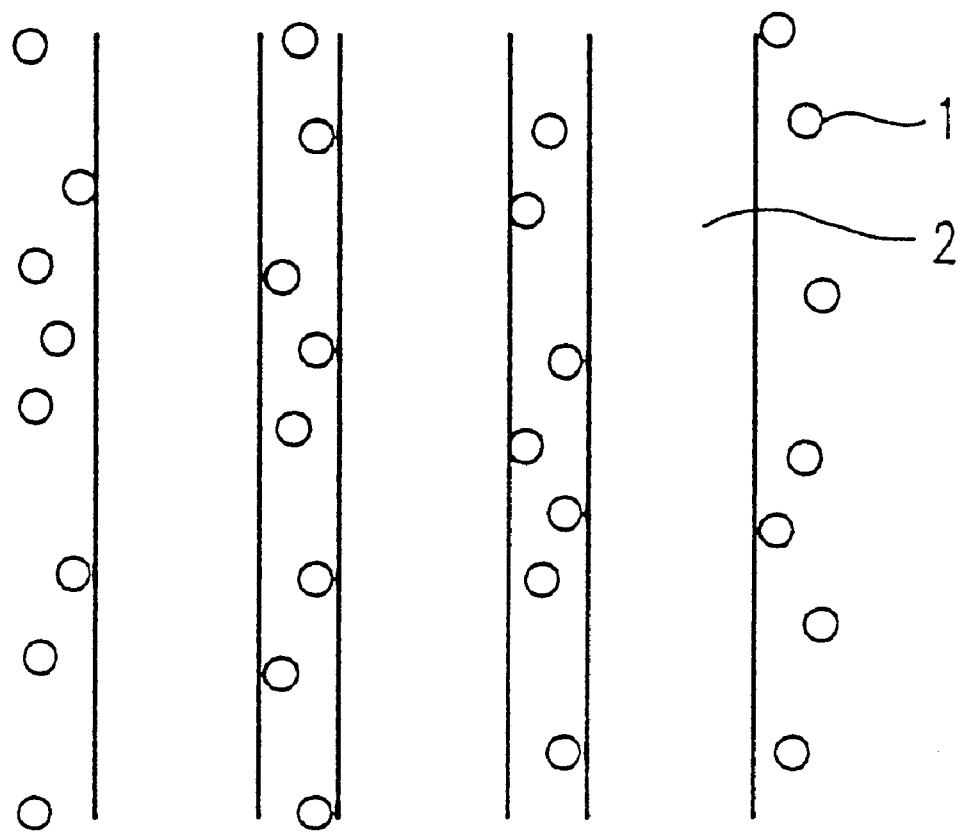
FIG. 5 is a plan view showing the arrangement of spacers on a substrate with a common electrode formed thereon in Examples 1, 2, 4, and 5 of the present invention.

Thereafter, the substrate 25 with the spacers 1 fixed thereon was soaked in water and washed by an ultrasonic cleaning method so as to remove the spacers 1 not adhering to the substrate 25. Thus, the spacers 1 were dispersed only in the regions other than the segmented electrodes 3, as shown in FIG. 5.

On the other hand, a sealant of an epoxy type was coated onto the substrate 24 by screen printing. The substrates 24 and 25 were attached to each other to obtain a liquid crystal display device 21 as shown in FIG. 1.

Figure 6:
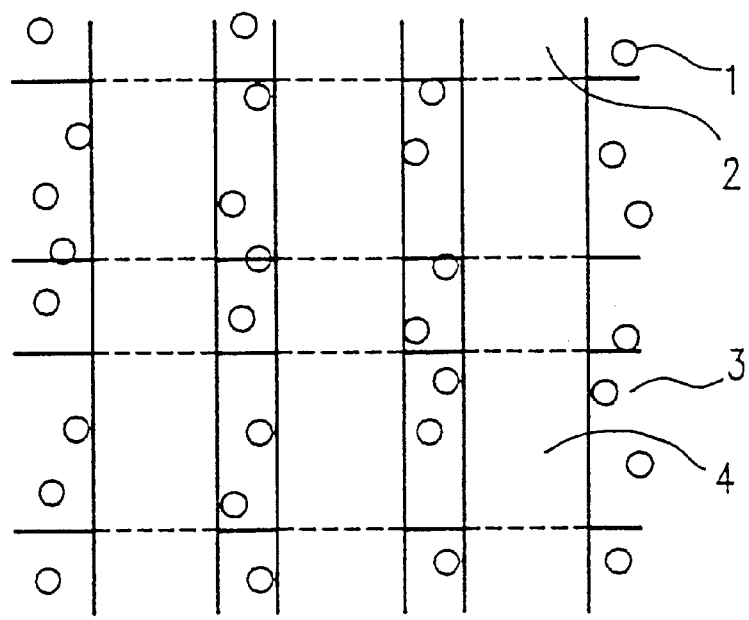
FIG. 6 is a plan view showing the arrangement of spacers in liquid crystal display devices in Examples 1 and 4 of the present invention.

In the liquid crystal display device 21, as shown in FIG. 6, the spacers 1 were not present on pixels 4 at which the common electrode 2 crossed the segmented electrodes 3. As a result, compared with a liquid crystal display device in which spacers were present over the entire surface of electrode substrate, contrast of the liquid crystal display device 21 increased by about 50%.

As is understood from FIG. 1, the spacers 1 were cured adhering to the substrate 25 in such a manner that a thermoplastic resin 32 covering the surface of the resinous beads was fixed to the substrate 25 due to heat-induced sagging. Therefore, the spacers 1 are not likely to move due to vibration and the spacers 1 were satisfactorily dispersed; uniformity of a cell gap was satisfactory.

EXAMPLE 2

Substrates 24 and 25 which were the same as those in Example 1 were subjected to alignment treatment in the same way as in Example 1, and a spacer dispersion liquid which was the same as that of Example 1 was used.

The spacer dispersion liquid was dispersed over the entire surfaces of the substrates 24 and 25 which had been subjected to alignment treatment. Then, infrared rays 5 were irradiated to the substrate 25 through a photomask 6 for a segmented electrode substrate, as shown in FIG. 2. Similarly, infrared rays were irradiated to the substrate 24 through a photomask for a common electrode substrate, whereby only spacers 1 in regions other than a common electrode 2 and segmented electrodes 3 were allowed to adhere to the substrate 24.

Figure 7:
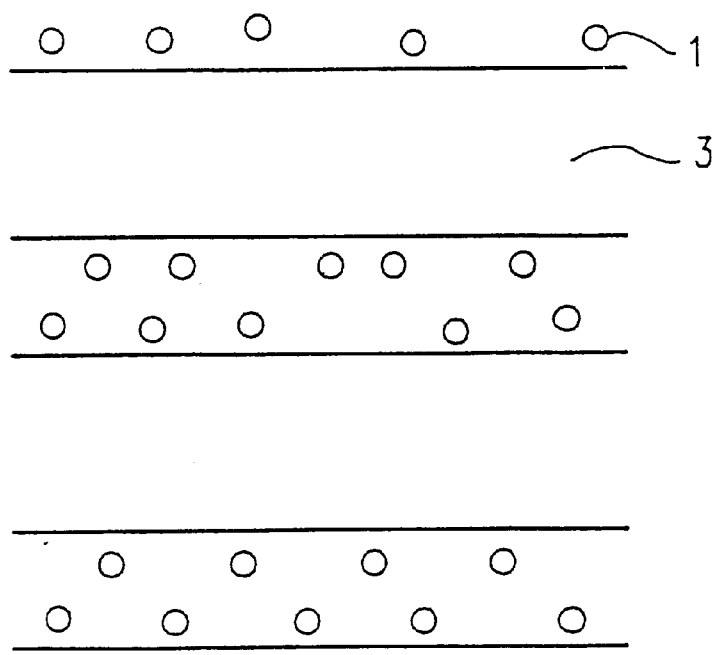
FIG. 7 is a plan view showing the arrangement of the spacers on an electrode substrate with segmented electrodes formed thereon in Examples 2 and 5 of the present invention.

Thereafter, the substrates 24 and 25 with the spacers 1 fixed thereon were respectively soaked in water and washed by an ultrasonic cleaning method so as to remove the spacers 1 not adhering to the substrate 25. Thus, the spacers 1 were dispersed only in the regions other than the segmented electrodes 3, as shown in FIGS. 5 and 7.

A sealant of epoxy type was coated onto the substrate 25 by a dispenser. The substrates 24 and 25 were attached to each other to obtain a liquid crystal display device 21 as shown in FIG. 1.

Figure 8:
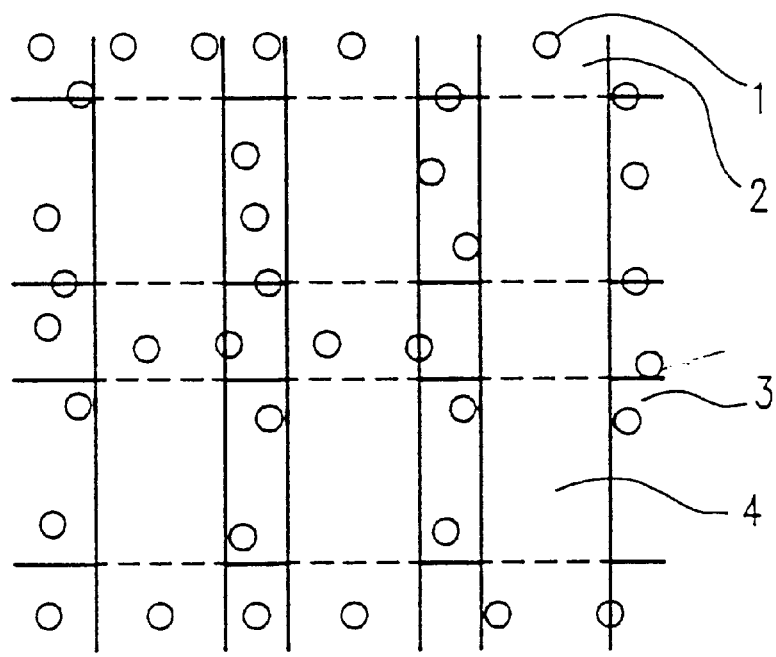
FIG. 8 is a plan view showing the arrangement of the spacers of the liquid crystal display devices in Examples 2, 3, 5, and 6 of the present invention.

In the liquid crystal display device 21, as shown in FIG. 8, the spacers 1 were not present on pixels 4 at which the common electrode 2 crossed the segmented electrodes 3. As a result, compared with a liquid crystal display device in which spacers were present over the entire surface of an electrode substrate, contrast of the liquid crystal display device 21 increased by about 50%.

As is understood from FIG. 1, the spacers 1 were cured adhering to the substrate 25 in such a manner that a thermoplastic resin 32 covering the surface of the resinous beads was fixed to the substrate 25 due to heat-induced sagging. Therefore, the spacers 1 are not likely to move due to vibration and the spacers 1 were satisfactorily dispersed; uniformity of a cell gap was satisfactory.

Furthermore, while the spacers were present in a stripe shape in Example 1, the spacers were present in a matrix in the present example, so that uniformity of a cell gap was more satisfactory than that of Example 1.

EXAMPLE 3

Substrates 24 and 25 which were the same as those in Example 1 were subjected to alignment treatment in the same way as in Example 1, and a spacer dispersion liquid which was the same as that of Example 1 was used.

The spacer dispersion liquid was dispersed over the entire surface of the substrate 25 which had been subjected to alignment treatment. Then, infrared rays 5 were used to irradiate the substrate 25 through a photomask 6 for a segmented electrode substrate, as shown in FIG. 2, whereby only spacers 1 in regions other than segmented electrodes 3 were allowed to adhere to the substrate 25.

Thereafter, similarly, infrared rays were used to irradiate the substrate 24 through a photomask for a common electrode substrate, whereby only spacers 1 in regions other than pixels 4 were allowed to adhere to the substrate 24.

Figure 9:
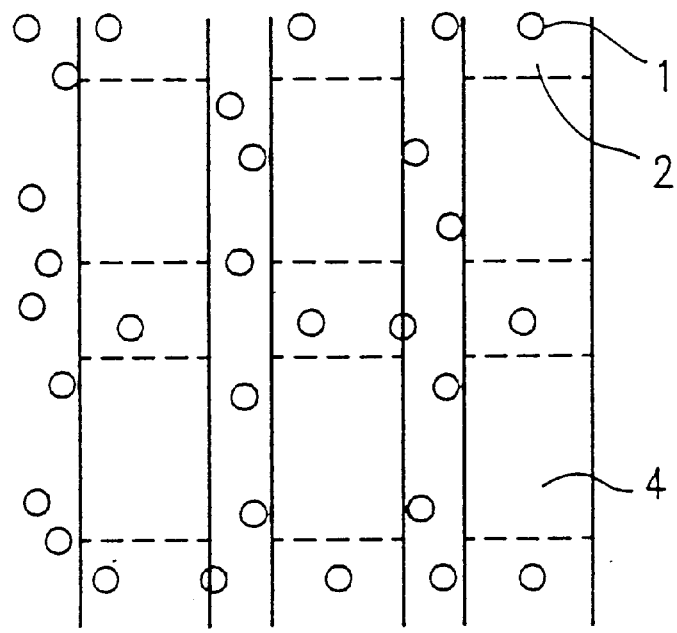
FIG. 9 is a plan view showing the arrangement of the spacers of the liquid crystal display device on a substrate with a common electrode formed thereon in Examples 3 and 6 of the present invention.

Thereafter, the substrate 25 with the spacers 1 fixed thereon were soaked in water and washed by an ultrasonic cleaning method so as to remove the spacers 1 not adhering to the substrate 25. Thus, the spacers 1 were dispersed only in the regions other than the pixels 4, as shown in FIG. 9.

A sealant of epoxy type was coated onto the substrate 24 by screen printing. The substrates 24 and 25 were attached to each other to obtain a liquid crystal display device 21 as shown in FIG. 1.

In the liquid crystal display device 21, as shown in FIG. 8, the spacers 1 were not present on pixels 4. As a result, compared with a liquid crystal display device in which spacers were present over the entire surface of electrode substrate, contrast of the liquid crystal display device 21 increased by about 50%.

As is understood from FIG. 1, the spacers 1 were cured adhering to the substrate 25 in such a manner that a thermoplastic resin 32 covering the surface of the resinous beads was fixed to the substrate 25 due to heat-induced sagging. Therefore, the spacers 1 are not likely to move due to vibration.

Furthermore, while the spacers were present in a stripe shape in Example 1, the spacers were present in a matrix in the present example, so that uniformity of a cell gap was as satisfactory as Example 2.

Figure 3:
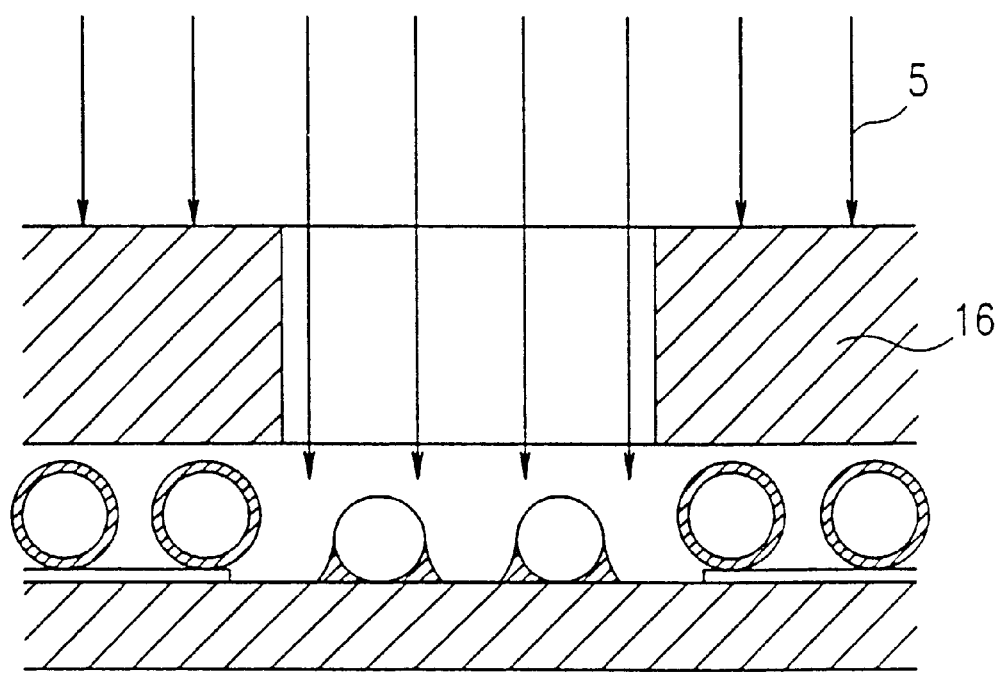
FIG. 3 is a schematic view of a liquid crystal display device when infrared rays are irradiated through a photomask having a light transmitting width smaller than that of the photomask used for patterning electrodes in Examples 1, 2, and 3 of the present invention.
Figure 4:
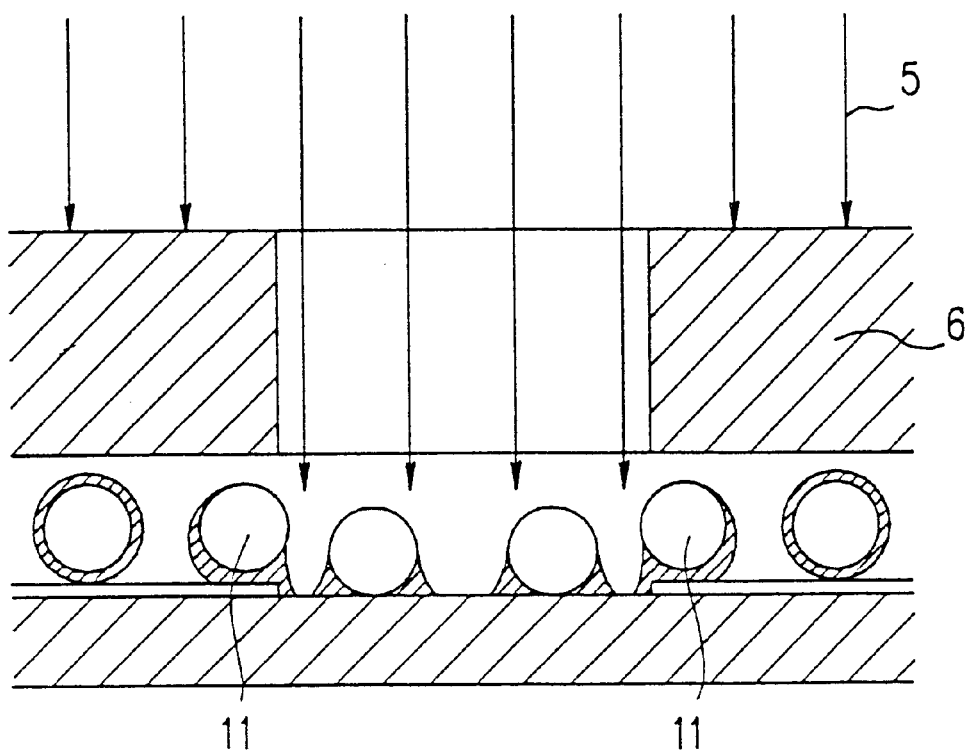
FIG. 4 is a schematic view of a liquid crystal display device when spacers present at a boundary between an electrode region and a region other than electrodes is irradiated with infrared rays to be fixed in Examples 1, 2, and 3.

In the above-described Examples 1, 2, and 3, as shown in FIG. 2, the photomask 6 used for patterning electrodes were repeatedly used during irradiation of the substrate by infrared rays 5, thereby reducing the expenses of production. By using a photomask 16 (shown in FIG. 3) having a smaller light transmitting width than that of the photomask 6 used for patterning electrodes, for example as shown in FIG. 4, the spacers 11 positioned at boundaries between electrode regions and regions other than the electrode regions, are prevented from adhering to the substrate and the spacers on the pixels or the electrodes can be more efficiently removed.

EXAMPLE 4

Substrates 24 and 25, which were the same as those in Example 1, were subjected to alignment treatment in the same way as in Example 1, and a spacer dispersion liquid which was the same as that of Example 1 was used.

Figure 10:
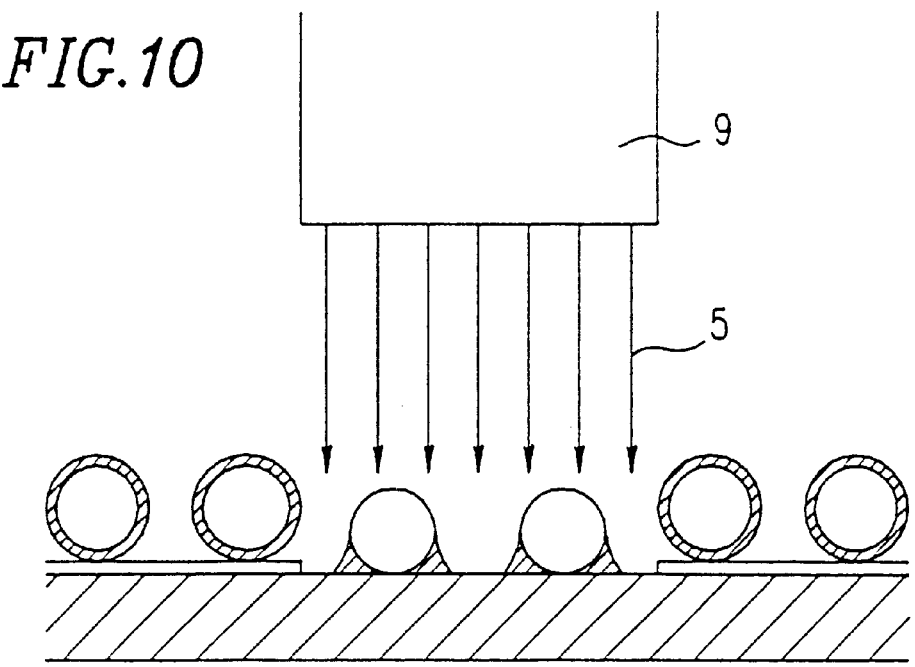
FIG. 10 is a schematic view when infrared rays are irradiated by an infrared rays laser in Examples 4, 5, and 6 of the present invention.
Figure 11:
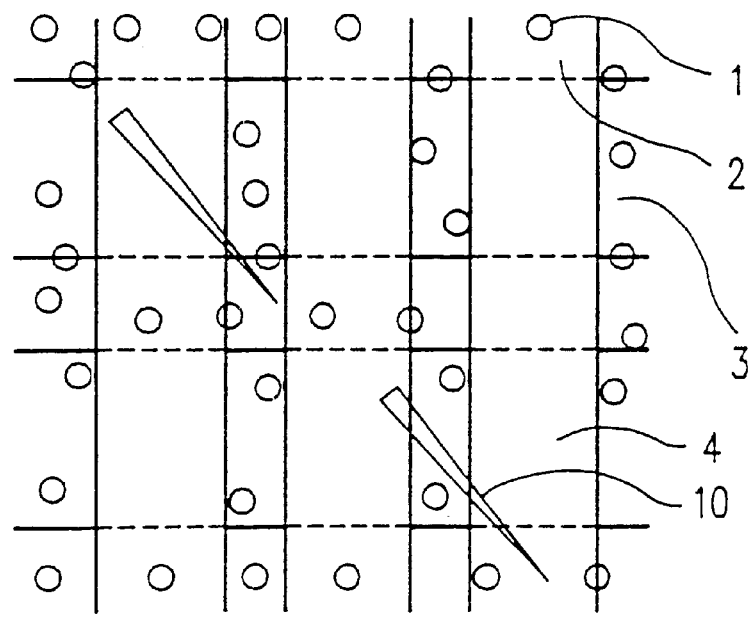
FIG. 11 is a plan view showing that an alignment film is damaged, which is a conventional problem.
Figure 12:
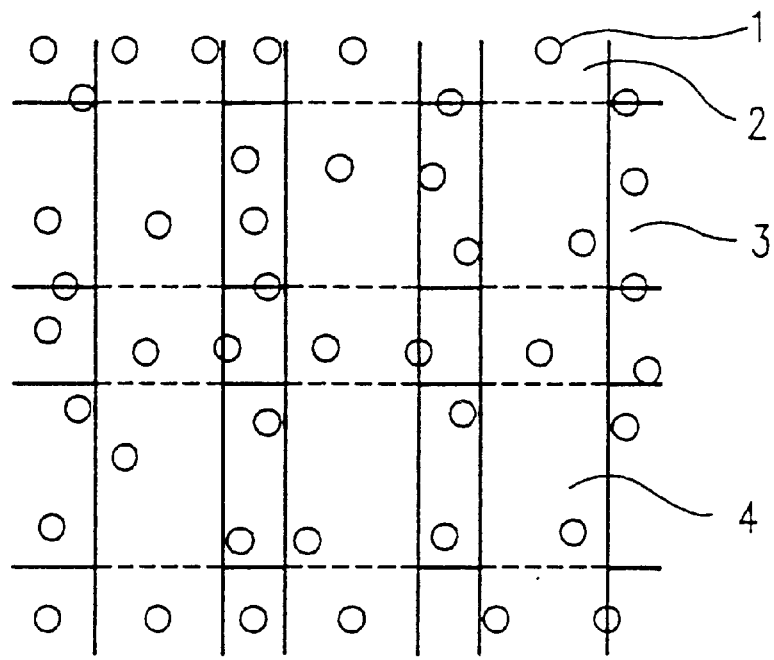
FIG. 12 is a plan view showing that spacers are present on pixel regions, which is a conventional problem.
Figure 13:
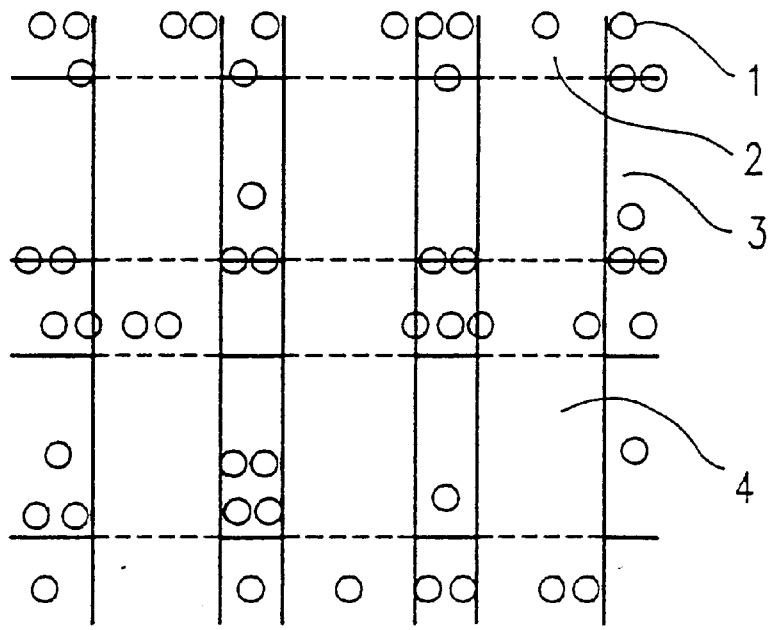
FIG. 13 is a plan view showing that spacers aggregate, which is a conventional problem.

The spacer dispersion liquid was dispersed over the entire surface of the substrate 24 which had been subjected to alignment treatment. Then, infrared rays 5 were irradiated to only regions other than a common electrode 2 by using an infrared rays laser device 9 as shown in FIG. 10.

Thereafter, the substrate 24 with the spacers 1 fixed thereon was soaked in water and washed by an ultrasonic cleaning method so as to remove the spacers 1 not adhering to the substrate 24. Thus, the spacers 1 were dispersed only in the regions other than the common electrode 2, as shown in FIG. 5.

A sealant of epoxy type was coated onto the substrate 25 by screen printing. The substrates 24 and 25 were attached to each other to obtain a liquid crystal display device 21 as shown in FIG. 1.

In the liquid crystal display device 21, as shown in FIG. 6, the spacers 1 were not present on pixels 4 at which the common electrode 2 crossed the segmented electrodes 3. As a result, compared with a liquid crystal display device in which spacers were present over the entire surface of an electrode substrate, contrast of the liquid crystal display device 21 increased by about 50%.

As is understood from FIG. 1, the spacers 1 were cured adhering to the substrate 24 in such a manner that a thermoplastic resin 32 covering the surface of the resinous beads was fixed to the substrate 24 due to heat-induced sagging. Therefore, the spacers 1 are not likely to move due to vibration and the spacers 1 were satisfactorily dispersed; uniformity of a cell gap was satisfactory.

EXAMPLE 5

Substrates 24 and 25, which were the same as those in Example 1, were subjected to alignment treatment in the same way as in Example 1, and a spacer dispersion liquid which was the same as that of Example 1 was used.

The spacer dispersion liquid was dispersed over the entire surfaces of the substrates 24 and 25 which had been subjected to alignment treatment. Then, infrared rays 5 were irradiated to only regions other than a common electrode 2 and segmented electrodes 3 by using an infrared ray laser device 9 as shown in FIG. 10. Thus, only the spacers 1 in regions other than the common electrode 2 and the segmented electrodes 3 were allowed to adhere to the substrates.

Thereafter, the substrates 24 and 25 with the spacers 1 fixed thereon were soaked in water and washed by an ultrasonic cleaning method so as to remove the spacers 1 not adhering to the substrates 24 and 25. Thus, the spacers 1 were dispersed only in the regions other than the common electrode 2 and the segmented electrodes 3, as shown in FIGS. 5 and 7.

A sealant of epoxy type was coated onto the substrate 25 by a dispenser. The substrates 24 and 25 were attached to each other to obtain a liquid crystal display device 21 as shown in FIG. 1.

In the liquid crystal display device 21, as shown in FIG. 8, the spacers 1 were not present on pixels 4 at which the common electrode 2 crossed the segmented electrodes 3. As a result, compared with a liquid crystal display device in which spacers were present over the entire surface of electrode substrate, contrast of the liquid crystal display device 21 increased by about 50%.

As is understood from FIG. 1, the spacers 1 were cured adhering to the substrates 24 and 25 in such a manner that a thermoplastic resin 32 covering the surface of the resinous beads was fixed to the substrates 24 and 25 due to heat-induced sagging. Therefore, the spacers 1 are not likely to move due to vibration.

Furthermore, while the spacers were present in a stripe shape in Examples 1 and 4, the spacers were present in a matrix in the present example, so that uniformity of a cell gap was as satisfactory as Examples 2 and 3.

EXAMPLE 6

Substrates 24 and 25 which were the same as those in Example 1 were subjected to alignment treatment in the same way as in Example 1, and a spacer dispersion liquid which was the same as that of Example 1 was used.

The spacer dispersion liquid was dispersed over the entire surface of the substrate 24 which had been subjected to alignment treatment. Then, infrared rays 5 were irradiated to only regions other than pixels by using an infrared rays laser device 9 as shown in FIG. 10. Thus, only the spacers 1 in regions other than the pixels 4 were allowed to adhere to the substrate 24.

Thereafter, the substrate 24 with the spacers 1 fixed thereon was soaked in water and washed by an ultrasonic cleaning method so as to remove the spacers 1 not adhering to the substrate 24. Thus, the spacers 1 were dispersed only in the regions other than the pixels 4, as shown in FIG. 9.

A sealant of epoxy type was coated onto the substrate 25 by screen printing. The substrates 24 and 25 were attached to each other to obtain a liquid crystal display device 21 as shown in FIG. 1.

In the liquid crystal display device 21, as shown in FIG. 8, the spacers 1 were not present on pixels 4.

As a result, compared with a liquid crystal display device in which spacers were present over the entire surface of an electrode substrate, contrast of the liquid crystal display device 21 increased by about 50%.

As is understood from FIG. 1, the spacers 1 were cured adhering to the substrate 24 in such a manner that a thermoplastic resin 32 covering the surface of the resinous beads was fixed to the substrate 24 due to heat-induced sagging. Therefore, the spacers 1 are not likely to move due to vibration.

Furthermore, while the spacers were present in a stripe shape in Examples 1 and 4, the spacers were present in a matrix in the present example, so that uniformity of a cell gap was as satisfactory as Examples 2, 3, and 5.

Various kinds of examples of the present invention have been described. As an electrode substrates for the liquid crystal display device of the present invention, a plastic sheet, a plastic film, or the like, as well as glass can be used. However, the material is not limited thereto. Furthermore, the presence of color filters, the presence of active elements, or the like are not particularly limited.

As a patterning method, laser patterning, wet etching, and the like can be used, although it is not limited thereto.

As an alignment film, various kinds of materials can be used, such as those which are subjected to polymerization reaction by heating, those which volatilize a solvent, and those which are subjected to polymerization reaction by being irradiated with light. The material is not limited thereto. It is also possible to form an insulating film for preventing a short circuit between the substrates. Examples of the method for forming an alignment film include offset printing, flexographic printing, and spin coating; however, it is not limited thereto. Examples of the method for alignment treatment include rubbing, and stampering; however it is not limited thereto.

Examples of the method for forming a seal include screen printing and drawing using a dispenser; however, it is not limited thereto.

Examples of the adhesive resin covering at least the surfaces of the spacers include the thermoplastic resin, such as polyester resin, polyamide resin, acryl resin, polyethylene resin, modified polyolefin resin, polyvinyl acetate ethylene resin, and polyurethane resin; however, it is not limited thereto. The physical properties preferable for the adhesive resin used in the present invention are solvent resistance, such as insolubility in isopropyl alcohol (IPA), and a melting point of 80° C. to 150° C. (in the case of a thermoplastic resin). When the melting point is lower than 80° C., adhesion strength decreases when the liquid crystal panel is stored at high temperatures. When the melting point is higher than 150° C., active elements such as TFTs are thermally damaged during the step of adhering the spacers. In the case of a liquid crystal display device using a plastic substrate, the melting point of the adhesive resin should not exceed the heat resistant temperature of the substrate. Some thermosetting resins, such as epoxy resin, phenol resin and the like can be used. In the case of thermosetting resin, it is preferable to have a softening point before being cured of 40° C. or more so as to obtain spacer retaining reliability. A mixture of thermoplastic resin and thermosetting resin can be used.

In addition, the adhesive resin covering the surface of the spacers does not have to cover the entire surfaces of the spacers. The adhesive resin preferably covers 50% or more of the surface of the spacers. The thickness of the adhesive layer is prescribed to be 1% to 2% of a core particle size (diameter of the spacers). When the thickness is 1% or less, the required adhesion may not be obtained. In particular, the portion of the adhesive layer fixed onto the substrate may become small. When the thickness is 2% or more, the portion of the adhesive layer fixed onto the substrate may become larger than the particle size, causing an orientation defect of liquid crystal in the vicinity of the spacers.

Regarding the sealant, liquid crystal material, and the like, there is no particular limit regarding the kind of materials which can be used.

The wavelength of the infrared rays is prescribed in the range of 1 $\mu$m to 20 $\mu$m. The intensity of the infrared rays can be 50 to 500 W, although not particularly limited.

According to the present invention, the adhesive resin on the surfaces of the spacers is cured adhering to the substrates, so that the spacers are not likely to move. Thus, a display defect caused by the movement of the spacers can be eliminated. Furthermore, since a thermoplastic resin is used as the adhesive resin, the thermoplastic resin is cured adhering to the substrate due to heat-induced sagging. Therefore, the adhesive resin have more adhesion strength with respect to the substrate.

The spacers are present in a stripe shape or in a matrix shape and can be allowed to adhere to the substrate with good dispersibility. Therefore, uniformity of a cell gap is not lost.

Furthermore, since the spacers can be allowed to adhere to the substrate after being subjected to alignment treatment, the spacers do not peel off during alignment film printing, rubbing, and the like. Thus, a display defect caused by peeling-off of the spacers can be eliminated.

The spacers can be allowed to adhere to desired regions without fail by using an infrared light source with a photomask, infrared laser device, and the like. Because of this, the spacers are easily prevented from being present on pixel regions, and the decrease in contrast caused by spacers on the pixels can be prevented; in particular, this is effective for projection. Furthermore, the photomask used for patterning electrodes can be repeatedly used.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a liquid crystal display device in which spacers for controlling a cell gap are selectively dispersed on at least one of a pair of substrates disposed so as to oppose each other with a liquid crystal layer interposed therebetween, comprising the steps of:

dispersing spacers at least surfaces of which are coated with an adhesive resin on the at least one of the pair of substrates;

using infrared rays to selectively irradiate the spacers to allow the spacers to selectively adhere to the substrates; and wherein the infrared rays are irradiated to the spacers through a photomask having a smaller light transmitting width than that of another photomask being used for patterning electrodes.

2. A method for producing a liquid crystal display device according to claim 1, wherein in the selective irradiation step the infrared rays are selectively irradiated to the spacers by scanning a infrared laser beam, thereby allowing the spacers to selectively adhere to the substrates.

3. A method for producing a liquid crystal display device according to claim 1, wherein in the selective irradiation step the infrared rays are irradiated to only the spacers dispersed in regions other than pixels, thereby allowing only the spacers dispersed in the regions other than the pixels to adhere to the substrates.

4. A method for producing a liquid crystal display device according to claim 1, wherein the spacer dispersing step is conducted after an alignment film is formed on the at least one of the pair of the substrate and the spacers adhere to the alignment film.

5. A method for producing a liquid crystal display device according to claim 1, further comprising the step of removing the spacers not irradiated with the infrared rays by an ultrasonic cleaning method.

6. A method for producing a liquid crystal display device according to claim 1, wherein in the selective irradiation step the infrared rays are irradiated to only the spacers dispersed in a region other than pixels, thereby allowing only the spacers dispersed in the region other than the pixels to adhere to the substrates.

7. A method for producing a liquid crystal display device according to claim 6, further comprising the step of removing the spacers not irradiated with the infrared rays by an ultrasonic cleaning method.

8. A method for producing a liquid crystal display device according to claim 6, further comprising the step of removing the spacers not irradiated with the infrared rays by an ultrasonic cleaning method.

9. A method for producing a liquid crystal display device according to claim 3, further comprising the step of removing the spacers not irradiated with the infrared rays by an ultrasonic cleaning method.

* * * * *